June 16, 1959     H. W. BRADLEY     2,890,852
CAR TOP CARRIER BRACKET
Filed Aug. 1, 1955
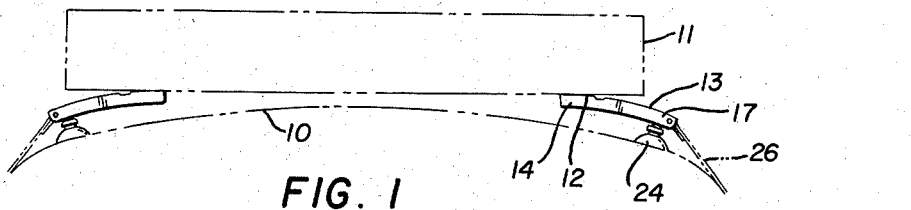
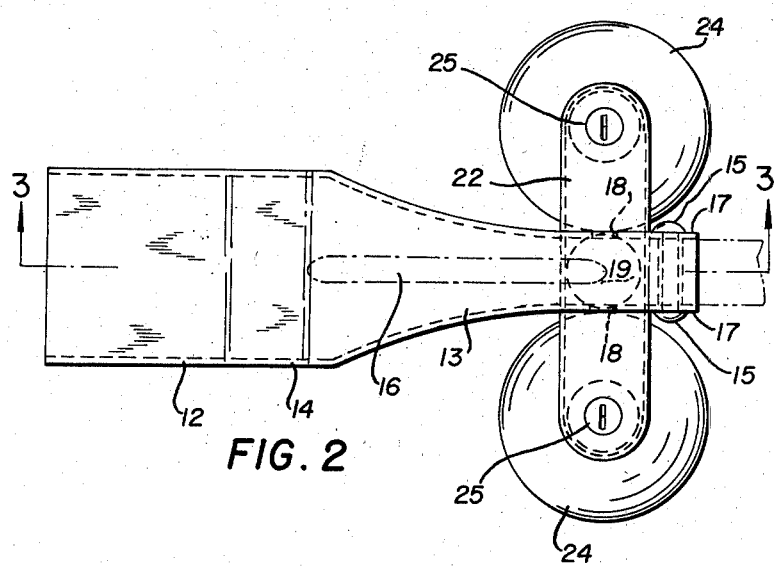
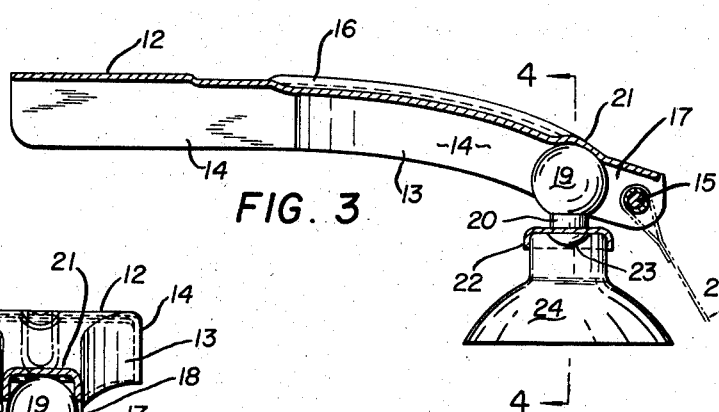
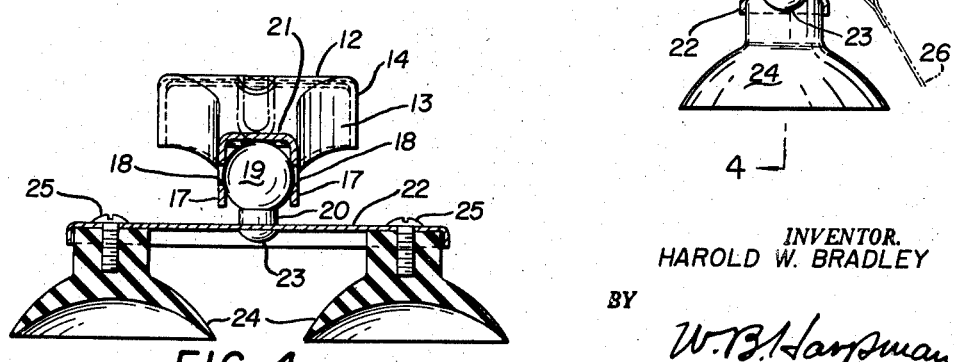
INVENTOR.
HAROLD W. BRADLEY
BY
*W. B. Hanyman*
ATTORNEY

United States Patent Office 2,890,852
Patented June 16, 1959

2,890,852

CAR TOP CARRIER BRACKET

Harold William Bradley, Uniontown, Ohio, assignor of fifty percent to Ralph L. Bradley, North Georgetown, Ohio Application August 1, 1955, Serial No. 525,744

3 Claims. (Cl. 248—206)

This invention relates to a car top carrier bracket and more particularly to a bracket which may be secured to a car top carrier and incorporates a vacuum cup assembly engageable on the car top.

The principal object of the invention is the provision of an improvement in a carrier bracket and vacuum cup assembly for car top mounting.

A further object of the invention is the provision of a bracket having a supporting element arranged to cage a sphere to which a vacuum cup assembly is attached.

A still further object of the invention is the provision of a vacuum cup mounting for a car top carrier that is universally adaptable to the contours of the car top.

A still further object of the invention is the provision of a car top carrier bracket which may be used as a component part of a luggage rack, storage box or other article to be carried on an automobile top.

The car top carrier bracket disclosed herein comprises an improvement in the art relating to such devices and particularly with respect to the formation of the bracket and the vacuum cup assembly carried thereby.

Car top carrier brackets and similar devices heretofore known in the art have comprised complex structures often manually adjustable to properly engage the automobile top and at the same time support the load thereon over a wide area thereof and not harm the finish of the car.

The present invention provides a car top carrier bracket and vacuum cup assembly which automatically achieves the worthwhile objects of supporting the load over a relatively wide area through the resilient vacuum cups which are arranged for automatic adjustment to match the contour of the particular portion of the car top engaged thereby.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the function and scope of the invention.

The invention is illustrated in the accompanying drawing, wherein:

Figure 1 is a front elevation of a pair of car top carrier brackets with broken lines indicating an object carried thereby on a car top.

Figure 2 is a top plan view of the car top carrier bracket.

Figure 3 is a horizontal section on line 3—3 of Figure 2.

Figure 4 is a vertical section taken on line 4—4 of Figure 3.

By referring to the drawings and Figure 1 in particular it will be seen that broken lines 10 represent the transverse top section of an automobile and broken lines 11 represent a car top carrier positioned thereabove and a pair of car top carrier brackets are positioned therebeneath and comprise channel members 12 having progressively narrowing end sections 13. Downturned flanges 14—14 of the channel members 12 are secured to one another by a transversely positioned fastener 15.

The channel members 12 are ribbed as at 16 longitudinally thereof and inwardly of their ends and in the end sections 13 in which the width thereof is progressively reducing. The outermost end portions 17 of the flanges 14 lie on spaced parallel planes and are apertured in oppositely disposed relation with round openings 18, as best seen in Figure 4 of the drawings.

A sphere 19 having a depending member 20 is caged in the area between the flanges 14 by the sphere's engagement in the round openings 18 therein. A portion 21 of the interconnecting web of the channel member 12 is bowed upwardly immediately above the sphere 19 and serves to assist in caging the sphere 19 between the oppositely disposed outermost end portions 17 of the flanges 14.

An arm 22 is secured midway between its ends to the depending member 20 as by a fastener 23 and a pair of vacuum cups 24—24 are secured to the arm 22 adjacent its opposite ends as by fasteners 25—25. The vacuum cups 24—24 are adapted to engage the car top 10 and when pairs of the car top carrier supporting brackets are secured to an object to be carried and positioned on the car top 10, retaining straps 26—26 may be secured to the transversely positioned fasteners 15 and extended to hooks (not shown) engaged beneath the eavestroughs on the car top.

The inner rectangular ends of the car top carrier brackets may be bolted or otherwise secured to the article to be carried thereby or they may be incorporated in the article as an integral part thereof as desired.

It will be observed that the channel members 12 are bowed longitudinally thereof in a convex shape extending from points inwardly of their ends as well as being progressively narrower and the vacuum cups 24—24 are thus positioned on either side of the narrowed end sections of the channel members 14 and closely spaced with respect to the parallel depending end flanges 17.

In assembling the car top carrier brackets, the sphere 19 is assembled to the depending member 20 and the arm 22 and the vacuum cups 24 attached thereto. The sphere 19 is then snapped into position between the oppositely disposed openings 18 in the parallel end portions 17 and the fasteners 15 inserted transversely through apertures provided for that purpose in the end portions 17 and the end portions 17 thereby held in predetermined spaced relation with respect to the sphere 19 and thus completes the caging action necessary to retain the sphere 19 in the position described.

When the car top carrier brackets are positioned on a car top, the sphere will turn in its mounting to permit the automatic conformation of the vacuum cups 24 to the particular portion of the car top engaged thereby and pressure brought to bear on the cups 24 will seat them and attach them to the car top where they will remain as there are no conflicting forces tending to move them from such.

It will thus be seen that the several objects of the invention have been met by the car top carrier bracket disclosed herein.

Having thus described my invention, what I claim is:

1. In a car top carrier bracket comprising a channel member bowed longitudinally and tapered progressively inwardly of one end, the improvement comprising the formation of the depending flanges of the channel member being in spaced parallel relation adjacent the narrow end of the member and having oppositely disposed openings therein, a portion of the web of the channel member above and between said openings being arched and a sphere caged in said channel member between said parallel depending flanges and partially engaged in said arched web portion and said openings, and a vacuum cup assembly secured to said sphere in depending relation with respect thereto.

2. The car top carrier bracket set forth in claim 1 and wherein a fastener is positioned between said depending flanges on the narrow end of said member to hold said depending flanges in spaced relation with respect to said sphere and to provide means of attachment for a tie-down strap.

3. In a car top carrier bracket comprising an elongated inverted channel member, one end of which is rectangular, and the opposite end of which is defined by uniformly spaced depending flanges having oppositely disposed openings inwardly from the ends thereof, the improvement comprising a fastener positioned through a pair of said oppositely disposed openings acting to hold said flanges in spaced relation and to provide an attachment means, and a sphere positioned between another pair of said openings in said flanges and caged thereby, a portion of the web of said channel member adjacent said last mentioned openings and thereabove being arched to conform to the shape of said sphere and to partially cage the same, a depending member on said sphere, an arm secured midway between its ends to said depending member and vacuum cups attached to the opposite ends of said arm.

References Cited in the file of this patent
UNITED STATES PATENTS

| | | |
|---|---|---|
| 1,896,898 | Hildebrand | Feb. 7, 1933 |
| 2,610,355 | Becker | Sept. 16, 1952 |
| 2,624,497 | Newman | Jan. 6, 1953 |
| 2,648,091 | Jones | Aug. 11, 1953 |
| 2,668,646 | Nielsen | Feb. 9, 1954 |
| 2,714,480 | Harris | Aug. 2, 1955 |